(12) United States Patent
Young et al.

(10) Patent No.: US 6,950,418 B1
(45) Date of Patent: Sep. 27, 2005

(54) CLIQUE ACTIVATION MULTIPLE ACCESS (CAMA)

(75) Inventors: C. David Young, Plano, TX (US); James A. Stevens, Allen, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 558 days.

(21) Appl. No.: 09/303,802

(22) Filed: Apr. 30, 1999

(51) Int. Cl.$^7$ .......................... H04B 7/212; H04Q 7/00
(52) U.S. Cl. ...................... 370/337; 370/314; 370/329
(58) Field of Search .............................. 370/204, 208, 370/229, 230, 254, 235, 276, 277, 278, 280, 370/281, 282, 294, 295, 314, 329, 330, 336, 370/337, 343–348, 436, 437, 442, 443, 458, 370/461, 462; 455/13.1

(56) References Cited

U.S. PATENT DOCUMENTS

| | | | |
|---|---|---|---|
| 5,038,398 A * | 8/1991 | Wills ........................... | 342/358 |
| 5,134,615 A * | 7/1992 | Freeburg et al. ............ | 370/330 |
| 5,245,609 A * | 9/1993 | Ofek et al. ............ | 340/825.02 |
| 5,291,475 A * | 3/1994 | Bruckert ...................... | 370/330 |
| 5,581,548 A * | 12/1996 | Ugland et al. ............... | 370/330 |
| 5,719,868 A * | 2/1998 | Young ......................... | 370/436 |
| 5,949,760 A * | 9/1999 | Stevens et al. ............. | 370/254 |
| 6,310,867 B1 * | 10/2001 | Tat et al. .................... | 370/330 |
| 6,314,084 B1 * | 11/2001 | Kahale et al. .............. | 370/230 |

OTHER PUBLICATIONS

"Bridging the Gap Interoperability, Survivability, Security" Lawrence Pond and Victor O. K. Li, 1989 IEEE Military Communications Conference, Conference Record, vol. 1 of 3.

IEEE Transaction On Information Theory, vol. IT-30, No. 4, Jul. 1984.

"Soldier Phone: An Innovative Approach to Wireless Multimedia Communications", Bittel, Caples, Young, IEEE Military Communications Conference, Milcom 98, vol. 3.

"A Hybrid Distributed Slot Assignment TDMA Channel Access Protocol" Sunlin, IEEE Military Communications Conference, 1990, vol. 3 of 3.

"USAP: A Unifying Dynamic Distributed Multichannel TDMA Slot Assignment Protocol" Young, Milcom 96 Conference Proceedings, vol. 1 of 3.

"Clique Activation Multiple Access (CAMA): A Distributed Heuristic for Building Wireless Datagram Networks" C. D. Young and J. Stevens, IEEE Military Communications Conference, Milcom 98, vol. 1.

U.S. Appl. No. 09/303,528, filed Apr. 30, 1999, entitled "Unifying Slot Assignment Protocol Multiple Access System" by C. David Young.

U.S. Appl. No. 09/303,526, filed Apr. 30, 1999, entitled "Unifying Slot Assignment Protocol Logical Neighborhooding" by C. David Young.

* cited by examiner

*Primary Examiner*—Hanh Nguyen
(74) *Attorney, Agent, or Firm*—Nathan O. Jensen; Kyle Eppele

(57) ABSTRACT

A type of channel access, Clique Activated Multiple Access (CAMA), is disclosed which allows neighboring nodes to form cliques for the purpose of supporting a broadcast channel. CAMA operates using only local knowledge, meaning it can scale to large networks. It also has the potential of requiring less channel resources than node allocation. In addition, it would lend itself well to an application like push-to-talk voice where only one transmitter per neighborhood is active (except for relay nodes.

3 Claims, 4 Drawing Sheets

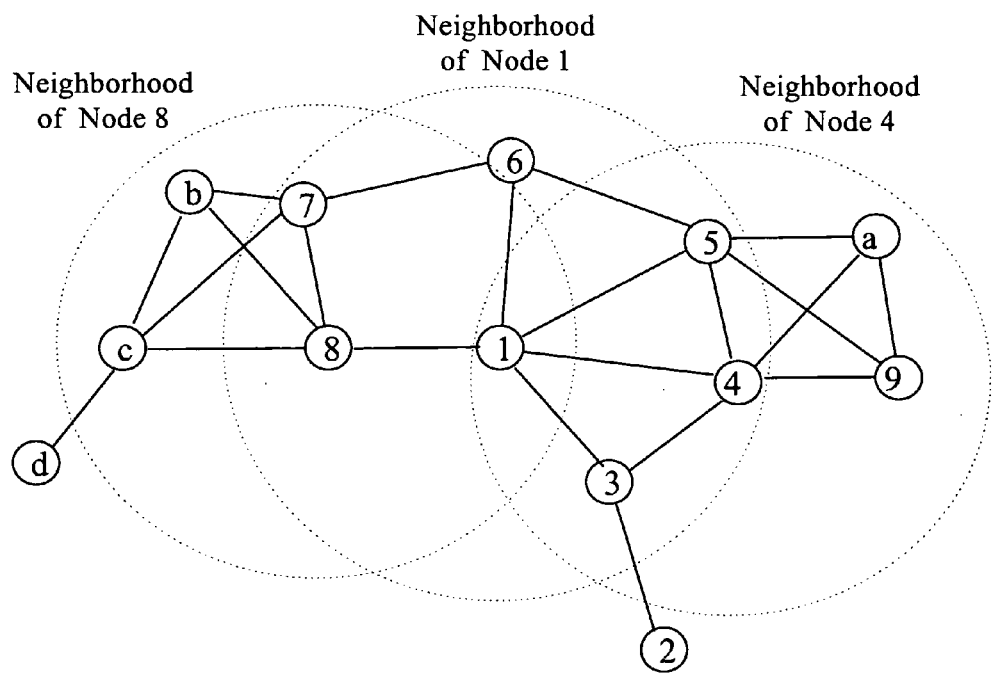
FIG. 1
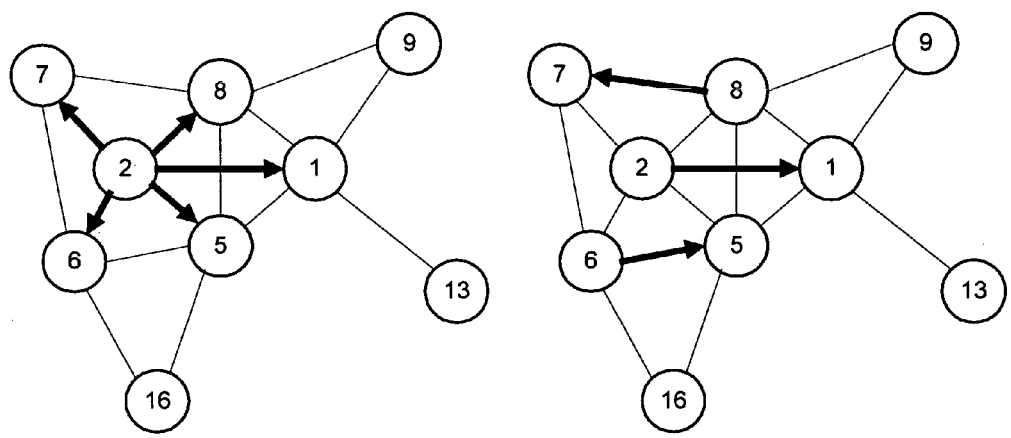
Node Activation
FIG. 2
Link Activation
FIG. 3

CLIQUE ACTIVATION MULTIPLE ACCESS (CAMA)

FIELD OF THE INVENTION

The present invention relates to a method of managing channel access between nodes of a network, and more particularly to a dynamic distributed multi-channel Time Division Multiple Access (TDMA) system. The method allows neighboring nodes to form cliques for the purpose of supporting a broadcast channel.

BACKGROUND OF THE INVENTION

Mobile multi-hop broadcast packet radio networks are known for their rapid and convenient deployment, self organization, mobility, and survivability. In this type of network as illustrated in FIG. 1, a transmission from one node, for example node 1, is broadcast to all nodes in its "neighborhood". Ultra-high frequency (UHF) systems generally have a neighborhood defined by nodes within line of sight of the transmitting node (these nodes being termed within one "hop" of the transmitting node). For example, in FIG. 1 nodes 1, 3, 4, 5, 6, 7, and 8 make up one neighborhood. For data transmitted from node 1 to propagate multiple hops, the data must be relayed by one or more of node 1's neighbors. For example, node "a" (likewise nodes b, c, and g) is two hops away from the node 1 transmitter. The data will be relayed in this manner until it has arrived at all intended destination nodes.

Collisions can generally be avoided by the assignment of time slots in which individual nodes can transmit because a typical receiver can only successfully process a single transmission. Various approaches can decide which nodes are assigned which slots. The approach is generally driven by the network applications, such as broadcast, multicast, unicast, datagrams, virtual circuits, etc. Because the problem of optimally assigning slots in this environment is mathematically intractable, a heuristic approach is taken to design an integrated protocol that both chooses the number of slots to assign to each neighboring node and coordinates their activation in the network.

Traditionally, there are two primary types of channel access schemes. The first, known in the literature as "node activation", depicted in FIG. 2, has a transmitter broadcast to all of its neighbors at once rather than individually. When a transmitter has only one intended receiver it is known as "link activation", depicted in FIG. 3. The former allows only one active transmitter in a neighborhood while the latter can potentially have several.

Node activation is especially well suited for broadcast messages like those used for address resolution. Link activation, on the other hand, lends itself better to high volume point-to-point traffic where allocations are made along the path of the traffic for the duration of a session. Thus, mobile multi-hop broadcast packet radio networks may use a hybrid network using node activations for low volume control traffic and occasional datagrams and link activations for high volume point-to-point traffic.

The Unifying Slot Assignment Protocol (USAP), which is the subject of U.S. Pat. No. 5,719,868 is a practical method to facilitate the implementation of the node and link activations in wireless networks.

When a node chooses an allocation, USAP enforces certain constraints to avoid interference within 2 hops of the transmitter. For link activation from node i to neighbor j, it must be an allocation:

that has not already been assigned to either node;
that i's neighbors are not receiving in; and
that j's neighbors are not transmitting in.

For node activation, a node i must choose an allocation:
that has not already been assigned to node i or any of its neighbors; and
none of i's neighbors' neighbors are transmitting in.

To achieve higher efficiency, it might be desirable to allow multiple transmitters in a neighborhood to share the same slot to utilize it more effectively. One such channel access technique would have the nodes sharing a slot simply take turns transmitting in the slot. This is easy to implement and scales to arbitrarily large groups sharing the same slot (albeit at the expense of arbitrarily large latencies.) Such a channel access technique has the drawback of requiring large overhead and is not significantly efficient.

Also, to achieve higher efficiency, it might be desirable to allow multiple transmitters in a neighborhood to share the same slot and to apply a number of higher level heuristics, such as those described in U.S. application Ser. No. 09/303,528 entitled Unifying Slot Assignment Protocol Multiple Access, which is herein incorporated by reference.

Thus, there is a need and desire for an alternative to USAP node allocation. There is also a need and desire for a USAP node allocation alternative that allows time slots to be shared among neighboring nodes.

SUMMARY OF THE INVENTION

The present invention relates to a method for automatically managing the communication channel resources between two transceiver nodes having neighboring nodes in a network of transceiver nodes. Each node communicates during specific time slots and uses multiple frequencies on a time multiplex basis. The method includes storing possible communication time slots and frequencies between transceiver nodes in the network at each transceiver node. The method further includes applying clique activation wherein multiple transceiver nodes in a clique utilize the same time slot for transmitting.

The present invention further relates to a method for automatically managing the communication channel resources between two nodes having neighboring nodes in a network of transceiver nodes. Each node communicates during specific time slots and uses multiple frequencies on a time multiplex basis. The method includes storing a table of possible communication time slots and frequencies between nodes in the network at each node. The method further includes measuring the qualities of each neighboring node, distributing the neighboring node qualities to neighboring nodes, calculating cliques, and choosing time slots for each clique.

The present invention still further relates to a communication network including a network of transceiver nodes. Each transceiver node has neighbors that utilize a time division multiple access structure. The time division multiple access structure has management slots, broadcast slots, and reservation slots. The time division multiple access structure includes a clique activation slot assignment protocol that chooses the number of slots to assign to each neighboring transceiver node and coordinates the activation of the slots for the neighboring transceiver nodes.

BRIEF DESCRIPTION OF THE DRAWINGS

The invention will become more fully understood from the following detailed description, taken in conjunction with the accompanying drawings, wherein like reference numerals refer to like parts, in which:

FIG. 1 is a general diagram of a network including nodes;

FIG. 2 is a general diagram illustrating node activation;

FIG. 3 is a general diagram illustrating link activation;

DESCRIPTION OF THE PREFERRED EMBODIMENTS

Figure 4:
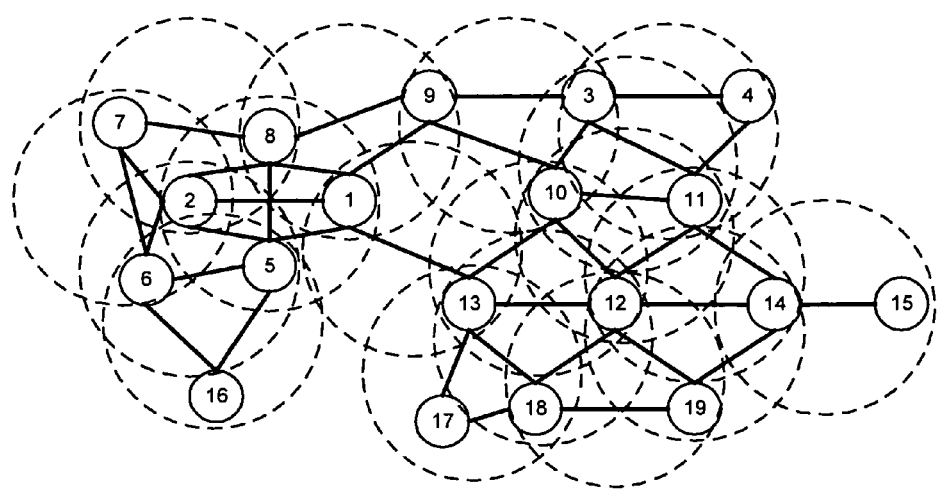
FIG. 4 is an exemplary diagram of a network of nodes illustrating cliques.

To achieve high efficiency of channel resources, it is desirable to have multiple transmitters in a neighborhood to share the same slot. For a group of transmitters to share a slot, they must all be neighbors of each other, that is, they must form a clique or a complete subgraph. Referring to FIG. 4, an exemplary network is depicted with all possible cliques shown circled by a dashed line.

Figure 5:
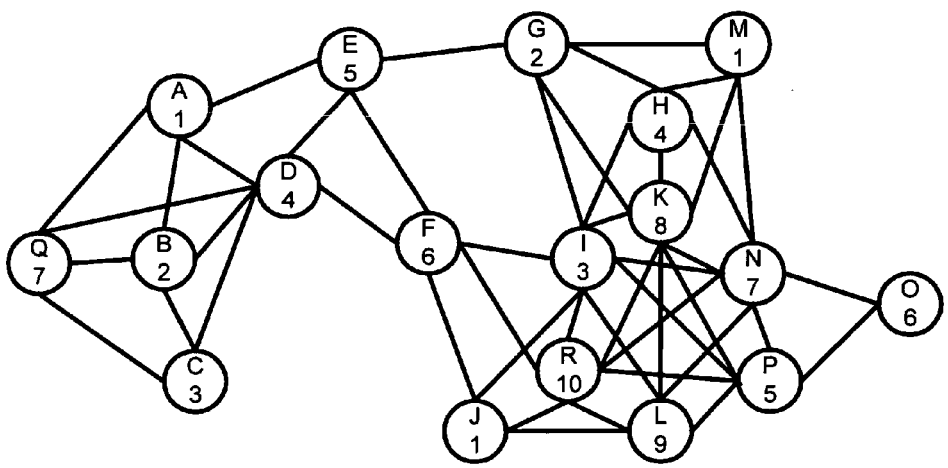
FIG. 5 is a general diagram of a network of nodes showing the interconnectivity between cliques.

In the exemplary network of FIG. 4, observe that if clique 7-2-8 uses one color (or time slot), clique 8-1-9 must use another, and 9-10-3 yet another to prevent interference. That is, if node 7 were to transmit at the same time on the same channel as node 9, node 8 would miss node 7's transmission. Thus, if one views the network from the clique perspective, it is a distance 2 vertex-coloring problem. This is represented in FIG. 5 where each clique becomes a vertex and the edges show the connectivity between the cliques. The letters identify the cliques while the numbers below them represent colors. Observe that this graph can be colored with no more than 10 colors (this however will be reduced to 5, for this case, as described below), which is still more expensive than the node activation heuristic requiring 7.

A potential advantage to the clique heuristic is that frequency can play a useful role in coloring. That is, while neighboring cliques must be on different time slots, cliques 2 hops apart can be on the same slot as long as they are on different channels. However, for many topologies this will make no difference since a lower bound on the number of slots required to color every clique is the maximum degree of any clique vertex plus 1. For instance, clique I of FIG. 5 has 9 neighbor cliques (F, G, H, J, K, L, N, P, R) so at least 10 slots are required. With this many slots it is possible to color the entire graph without resorting to different frequencies. Therefore, as in the node activation, it might make sense to use a single channel and leave the other channels reserved for link activation.

Cliques can be created using a list of neighbors and a list of each neighbor's neighbors. To generate the cliques that a node is a member of, a node must consider all combinations of its node identification (id) (a node id is a numerical tag or name given to each network node to distinguish it from other network nodes) with those ids of its neighbors (using its neighbor list) and the node must examine each combination for complete connectedness (using each neighbor's list of neighbors). One such algorithm involves a depth-first walk of the tree rooted at the node id whose branches represent a systematic growth of every possible clique by adding neighbors in every possible order (i.e. every combination and permutation). Since this has time complexity $O(n!)$, two optimizations are made to trim fruitless branches and reduce this to $O(2^n)$. These optimizations are:

1) Creating a branch only when adding a neighbor of all the current clique members.
2) Adding neighbors in increasing order of node id and trimming branches that have already been generated by another permutation of the same neighbors.

Figure 6:
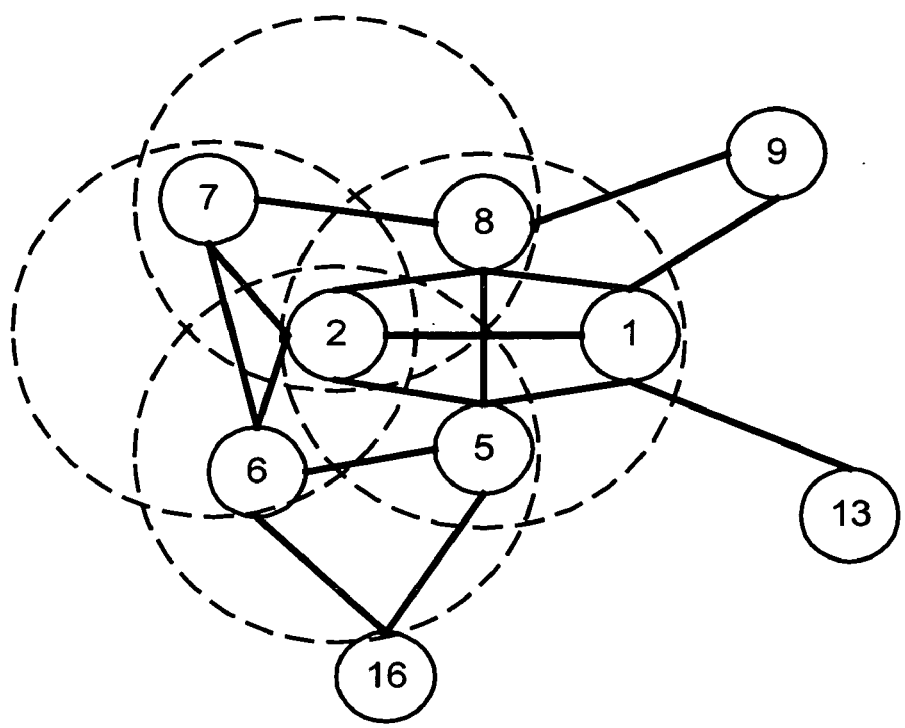
FIG. 6 is an exemplary diagram illustrating an exemplary clique arrangement.
Figure 7:
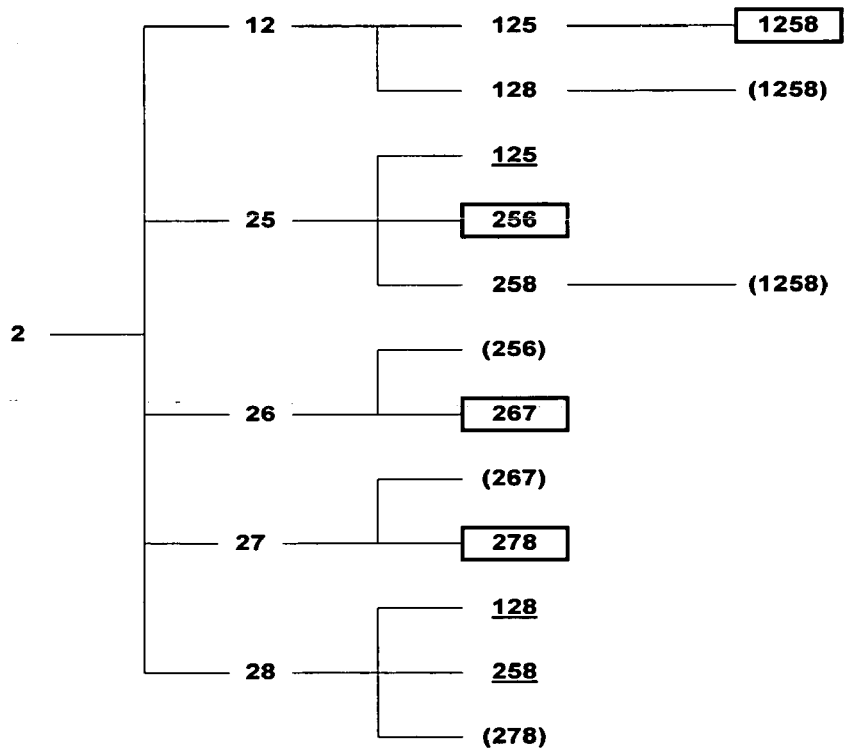
FIG. 7 is an exemplary tree diagram illustrating the process of obtaining cliques.

As an example, this algorithm is applied to the network depicted in FIG. 6 to find the cliques that node 2 belongs to. The resulting tree is shown in FIG. 7 with the cliques of node 2 shown boxed. In FIG. 7 cliques that are in parentheses were previously found and are therefore redundant. Partial cliques on other branches that were previously traversed are shown underlined. Thus, the cliques containing node 2 are found in the following order: {1,2,5,8}, {2,5,6}, {2,6,7}, and {2,7,8}.

The implementation to determine the cliques is a traditional recursive depth-first tree walk with the addition of the two optimizations. A neighbor id is represented as a bit position in an array so that the logical OR function can create a set using the member id's to allow fast manipulations and comparisons of neighbor lists and cliques. The label on each branch is in fact the bit map of the current clique.

The first optimization (adding only eligible neighbors to the current clique) results from the logical AND function between the neighbor lists of the current members. The second optimization (trimming subtrees that have already been traversed) results from adding the neighbors in order of increasing id. This guarantees that subtrees of a particular height will be searched in order of the roots' labels, making it possible to recognize duplicate subtrees by merely keeping track of the largest label encountered at a particular level.

Thus, the pseudocode of the algorithm for finding the set of cliques C which node i belongs to is as follows:

```
//
// Start off with the set of cliques C empty except
// for the trivial clique consisting of i alone. Use
// array L to keep track of the largest label found
// at each level. Call the function FindCliques( )to //
   generate the cliques.
//
// set C={{i}}
// set array L[1..max #neighbors]={{ }, { }, . . . , { }}
FindCliques({i})
//
// A recursive procedure for adding new members to
// the given clique S
//
FindCliques(set S)
{
    set N={11..1}
    ∀n∈S
        N=N∩{neighbors of n}
    ∀n ∈N in order of smallest n to largest
    {
        // Enlarge S by adding the neighbor
        S'=S ∪{n}
        // If the label is larger than any encountered
        // at this level, enlarge this clique
            // and recurse into this subtree.
```

```
IF S'>L[|S|]
{
    L[|S|]=S'
    // Delete S from C if it exists and add the
    // enlarged S back in
    C=C-{S}
    C=C∪{S'}
    // Try to enlarge clique even more
        call FindCliques(S')
}
}
}
```

In the process of finding all maximal size cliques, this algorithm generates all cliques of smaller sizes. This is equivalent to summing binomial coefficients, yielding $2^n$ such cliques in a fully connected network of size n, which is the worst case running time for this algorithm. Thus, the time complexity is at least $O(2^n)$. This is not surprising since the problem of finding a clique of maximum size in a graph is NP-complete. This does not prevent the algorithm from being useful for the topologies typically encountered by Soldier Phone, where a neighborhood of 16 nodes or less is normal. In an alternative embodiment, denser networks can be handled by limiting the number of neighbors that any node will accept.

Assuming that CAMA will be restricted to a single channel, the slot assignment is as follows. It occurs in 3 synchronized phases at each node:
1) measure neighbor qualities;
2) distribute the results from phase 1 and calculate the cliques and choose slots; and
3) use the slots from phase 2.

Note that in phase 2 each member of a clique independently chooses the slot to be used for that clique, so that they must have exactly the same information to arrive at the same choice. This information is just that required to enforce the distance 2 vertex-coloring of the clique graph. It is shared between nodes as part of the net management operational packet (NMOP) broadcast periodically by each node to all of its neighbors, the NMOP includes:
1) the set of neighbors (N) along with their measured qualities from phase 1;
2) the set of this node's cliques (C) with the chosen slots (CS); and
3) the set of this node's neighbors' cliques (NC) with the chosen slots (NCS) (exclusive of those already listed in item 2).

In order to choose a slot, the members of the clique must generate the set of slots that are already in use within 2 clique hops. It does this by combining its CS with the CS's and NCS's from all of its neighbors. If a clique has not yet been assigned a slot, the nodes of this clique pseudo-randomly choose from among the available slots.

This random choice of slots will occasionally result in exceptions to the distance 2 vertex-coloring rule. Exceptions can also result from the measures taken to limit the size of neighborhoods in dense networks. However, the conflicts will be obvious because a node will either end up choosing the same slot for two cliques or a neighbor will report a CS with the same slot for a different clique. When a node detects this condition, it should drop the conflicting slot choice from its CS, which will cause the other nodes in the affected clique to drop the slot also. Then the next phase 2 will cause a new pseudo-random choice.

Trying to assign slots to all cliques randomly increases the risk of running out of slots and leaving the net partitioned. Therefore, in a preferred embodiment, to decrease the chance of this happening, the slots can be assigned in a certain order to try to include all nodes in at least one clique before assigning slots to the remaining cliques. The idea is to first assign slots to cliques that have an isolated node on the edges of the network, then to assign slots to the most richly connected cliques in the interior, and then to assign slots to cliques that bridge these. Thus, a clique is assigned a slot under the following conditions and in the following order:
1. The clique has a node that is only a member of one clique.
2. The clique has more or an equal amount of neighboring cliques than any neighboring clique.
3. The clique has 2 or more neighbors assigned slots in steps 1 and 2.
4. The clique has 2 or more neighbors assigned slots in step 1.
5. The clique has a node that has not been covered by a clique from the previous steps.
6. The clique has not yet been assigned a slot in the previous steps.

Figure 8:
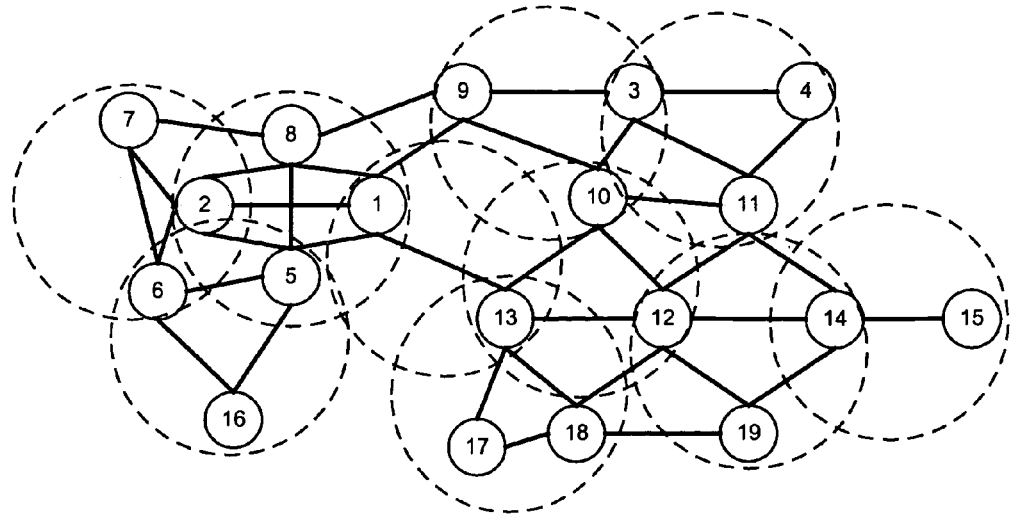
FIG. 8 is an exemplary diagram illustrating the optimized clique coverage.
Figure 9:
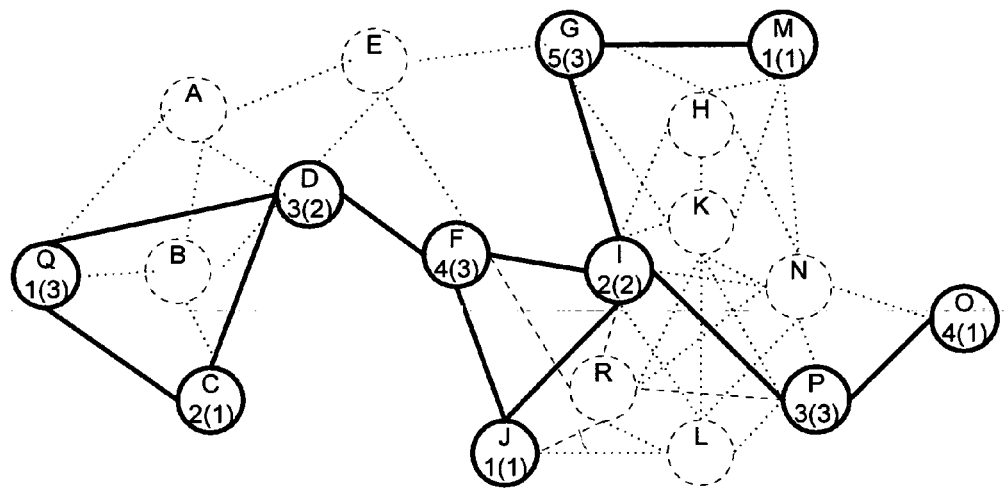
FIG. 9 is an exemplary diagram depicting a network of nodes and illustrating an optimized clique arrangement.

Notice that the application of these rules requires no more knowledge than is already available in the NMOP, namely the sets of this node's cliques and this node's neighbors' cliques. Applying just steps 1 to 3 to the exemplary network of FIG. 4 results in all of the nodes being covered as depicted in FIG. 8. This is reflected in the clique graph depicted in FIG. 9 where the colors are followed by the step applied in parentheses.

Notice that only 5 colors are required compared to the 7 colors of the original node allocation heuristic. If a total of 10 slots were available, the remaining 5 slots assigned during the application of the subsequent steps could serve to enrich the connectivity of the mesh for the sake of robustness. Another option is to leave the remaining slots unassigned to make link allocations on the other channels possible.

It should be noted that the method described above may be utilized in combination with any number of higher level heuristics, configured for a set of specifications. For example, a management slot or bootstrap slot protocol, a soft circuit protocol, a hard circuit protocol, a standby slot protocol, a speculation slot protocol, or any other suitable protocol.

It is understood that while the detailed drawings and examples given describe preferred exemplary embodiments of the present invention, they are for the purposes of illustration only. The method and apparatus of the invention is not limited to the precise details and conditions disclosed. For example, it is not limited to the specific time frame and time slot lengths. Various changes may be made to the details disclosed without departing from the spirit of the invention, which is defined by the following claims.

What is claimed is:
1. A method for automatically managing the communication channel resources between two transceiver nodes having neighboring transceiver nodes in a network of transceiver nodes, wherein each node communicates during specific time slots and uses multiple frequencies on a time multiplex basis, the method comprising:
   storing possible communication time slots and frequencies between nodes in the network at each transceiver node; and
   assigning each node to at least one of a plurality of cliques, wherein each of the plurality of cliques consists of a plurality of nodes that are positioned to directly communicate with each other, wherein multiple transceiver nodes in a clique utilize the same time slot for transmitting;

wherein the assigning step for each node comprises:

(a) identifying one of the nodes:
(b) identifying a first group of nodes, said first group of nodes comprising any nodes that directly communicate with the node identified in step (a);
(c) for each node in the first group of nodes, identifying a second group of nodes, said second group of nodes comprising any nodes that directly communicate with said each node in the first group of nodes; and
(d) including within a clique with the node identified in step (a) a node in said first group of nodes, and a node in said second group of nodes that communicates directly with the node identified in step (a) and with said node in said first of nodes.

2. The method of claim 1 wherein the transceiver nodes within a clique take turns transmitting within a shared time slot.

3. The method of claim 1, further comprising choosing time slots for each clique.

* * * * *